United States Patent [19]

Maus et al.

[11] Patent Number: 5,130,208

[45] Date of Patent: * Jul. 14, 1992

[54] HONEYCOMB BODY WITH INTERNAL LEADING EDGES, IN PARTICULAR A CATALYST BODY FOR MOTOR VEHICLES

[75] Inventors: Wolfgang Maus; Helmut Swars, both of Bergisch Gladbach; Ludwig Wieres, Overath, all of Fed. Rep. of Germany

[73] Assignee: Emitec Gesellschaft Fuem Emisstonstechnologie mbH, Lohmar, Fed. Rep. of Germany

[ * ] Notice: The portion of the term of this patent subsequent to Sep. 3, 2008 has been disclaimed.

[21] Appl. No.: 696,613

[22] Filed: May 7, 1991

Related U.S. Application Data

[62] Division of Ser. No. 559,370, Jul. 27, 1990, Pat. No. 5,045,403.

[30] Foreign Application Priority Data

Jul. 27, 1989 [DE] Fed. Rep. of Germany ....... 8909128

[51] Int. Cl.$^5$ ............................ B01J 35/04; F01N 3/28
[52] U.S. Cl. ..................... 428/593; 428/597; 428/603; 502/439; 502/527
[58] Field of Search .......... 428/593, 603, 604, 592, 428/597; 502/527, 439; 422/180

[56] References Cited

U.S. PATENT DOCUMENTS

| 1,987,798 | 1/1935 | Ruppricht . | |
|---|---|---|---|
| 2,329,789 | 9/1943 | Schank et al. | 428/603 |
| 3,716,344 | 2/1973 | Ashburn | 422/180 |
| 3,869,778 | 3/1975 | Yancey | 428/603 |
| 3,981,689 | 9/1976 | Trelease | 428/593 |
| 4,152,302 | 5/1979 | Nonnenmann et al. | 502/527 |
| 4,190,559 | 2/1980 | Retallick | 428/603 |
| 4,273,681 | 6/1981 | Nonnenman | 502/527 |
| 4,576,800 | 3/1986 | Retallick | 422/180 |
| 4,597,262 | 7/1986 | Retallick | 422/180 |
| 4,647,435 | 3/1987 | Nonnenmann | 422/180 |
| 4,665,051 | 5/1987 | Nonnenmann | 422/180 |

FOREIGN PATENT DOCUMENTS

| 0152560 | 8/1985 | European Pat. Off. . |
| 0186801 | 7/1986 | European Pat. Off. . |
| 0220468 | 5/1987 | European Pat. Off. . |
| 0244798 | 11/1987 | European Pat. Off. . |
| 0245736 | 11/1987 | European Pat. Off. . |
| 0245737 | 11/1987 | European Pat. Off. . |
| 0279159 | 8/1988 | European Pat. Off. . |
| 1192624 | 1/1966 | Fed. Rep. of Germany . |
| 2001547 | 2/1979 | United Kingdom . |

OTHER PUBLICATIONS

Manfred Nonnenmann-New High-Performance Gas Flow Equalizing Metal Supports for Exhaust Gas Catalysts-Automobil-technische Zeitschrift 91-pp. 185 to 192.

Primary Examiner—John Zimmerman
Attorney, Agent, or Firm—Herbert L. Lerner; Laurence A. Greenberg

[57] ABSTRACT

A honeycomb body, especially a catalyst carrier body, includes at least partly structured metal sheets forming walls of a plurality of channels through which a fluid can flow. Some of the sheets have a primary corrugation with crests, troughs and a given corrugation height. The crests and/or the troughs having a plurality of inverted regions with a height being at most equal to the given corrugation height and preferably between ⅓ and ⅔ of the given corrugation height.

66 Claims, 2 Drawing Sheets

HONEYCOMB BODY WITH INTERNAL LEADING EDGES, IN PARTICULAR A CATALYST BODY FOR MOTOR VEHICLES

This is a division of application Ser. No. 559,370, filed July 27, 1990 now U.S. Pat. No. 5,045403.

BACKGROUND OF THE INVENTION

1. Field of the Invention

The invention relates to a honeycomb body, in particular a catalyst body for motor vehicles, including at least partly textured layered metal sheets forming walls of a plurality of channels through which a fluid can flow.

2. Description of Related Art

Many embodiments of metal catalyst carrier bodies of such a type are known and are described, for instance, in Published European Application Nos. 0 220 468 Al, corresponding to U.S. Pat. No. 4,878,746; 0 279 159 Al, corresponding to U.S. Pat. No. 4,845,073; 0 245 737 Al, corresponding to U.S. Pat. No. 4,832,998; or 0 245 736 Al.

It has long been known that in most applications and given the usual dimensions of such honeycomb bodies, the flow in the channels is essentially laminar, because very small channel cross sections are used. Under such conditions, relatively thick boundary layers form at the channel walls, which reduce contact between the core flow in the channels and the walls. Processes of diffusion between the core flow and the boundary layer partly balance this out, but still attempts have long been made to gain improvements with such devices by means of special structuring of the honeycomb body.

For instance, it is known from German Patent DE-PS 1 192 624, corresponding to U.S Pat. No. 3,208,131, to make the honeycomb body from a large number of disks that are disposed in succession and have the channels which are offset from one another in the flow direction. A body that is constructed in that way has a succession of new leading edges in the interior thereof, at which the flow is split. Preferably, disks made of spirally rolled smooth and corrugated metal sheets are used in succession, with the direction of rolling being changed each time. On one hand, such a structure is very expensive from a production standpoint because of the many small disks, and on the other hand it leads to irregular configurations of the channels that are offset from one another, which can be disadvantageous during the coating operation and during later operation.

In Published European Application Nos. 0 152 560 Al and 0 186 801 A2, possibilities for achieving the same concept are described that are more advantageous in production terms, because they do not require assembly of a honeycomb body from a plurality of disks. However, the undulating forms described therein do result in considerable proportions of the surface area of the metal sheets being used contacting one another, and as a result the usable area for catalytic contacting is disadvantageous in proportion to the amount of material being used.

In a survey article by M. Nonnenmann, entitled "Neue Metallträger für Abgaskatalysatoren mit erhöhter Aktivität und innerem Strdmungsausgleich" [New Metal Carriers for Exhaust Gas Catalysts That Have Increased Activity and Internal Flow Equalization] ATZ Automobiltechnische Zeitschrift [Automobile Industry Journal] 91 (1989), 4, pp. 185–192, describing the advantages and effects of flow channels that are offset from one another in the flow direction, a variant is also proposed in which instead of a smooth sheet metal layer, a so-called micro-corrugated strip is used, which makes for somewhat more advantageous utilization of the surface area. However, a micro-corrugation strip, along with smooth contacting surfaces, forms tiny channels on other structured sheet-metal strips, which become clogged during a later coating operation and thus result in a considerable increase in pressure loss and a further increase in active surface area as well as an unnecessary consumption of coating composition. Nevertheless, the article shows that because of the production options, a metal catalyst carrier body is superior to an extruded ceramic body, because the flow conditions in the interior can be influenced by structural provisions. An additional effect can arise, namely the transverse mixing of flows in the various channels through corresponding connecting paths or openings in the channel walls.

SUMMARY OF THE INVENTION

It is accordingly an object of the invention to provide a honeycomb body with internal leading edges, in particular a catalyst body for motor vehicles, which overcomes the hereinafore-mentioned disadvantages of the heretofore-known devices of this general type, in which the advantages of internal walls being offset from one another can be exploited and in which only small portions of the surface area of the individual layers contact one another. Aspects having to do with manufacturing techniques should also be taken into account, in order to keep down the expense for producing such honeycomb bodies.

With the foregoing and other objects in view there is provided, in accordance with the invention, a honeycomb body, especially a catalyst carrier body, comprising at least partly structured metal sheets forming walls of a plurality of channels through which a fluid can flow, some of the sheets having a primary corrugation with crests, troughs and a given predetermined corrugation height, and the crests and/or the troughs having a plurality of inverted regions or eversions with a height being less than or equal to the given corrugation height, and preferably between $\frac{1}{3}$ and 2/3 of the given corrugation height.

A honeycomb body of this kind is particularly suitable as a catalyst carrier body, preferably for motor vehicles equipped with internal combustion engines. The inverted regions create additional leading edges in the interior of the honeycomb body and together with the primary corrugations form a structure that lessens the formation of boundary layers as a fluid flows through them. Such a body has a higher catalytic conversion rate, for the same consumption of material, than corresponding bodies lacking inverted regions. If the structured sheets are disposed in layers, the areas of contact between the individual layers are also reduced in size by the inverted regions.

Considering the flow conditions in such a honeycomb body, in accordance with another feature of the invention, the inverted regions have a length of approximately 4 to 20 mm, and preferably 8 to 16 mm, so that if at all possible closed boundary layers cannot even form.

In accordance with a further feature of the invention, at least two of the inverted regions are formed in succession on each crest and/or each trough in the flow direction, in order to create repeatedly new additional leading edges.

In accordance with an added feature of the invention, the spacing between two successive inverted regions on a crest or trough is on the same order of magnitude as the length of the inverted regions, that is approximately 4 to 20 mm and preferably 8 to 16 mm.

Depending on the depth of the inverted regions, they can be located directly beside one another both on a crest and in a trough. However, for the sake of stability, it is more advantageous if, in accordance with an additional feature of the invention, the inverted regions in the crests are shifted in a flow direction with respect to the inverted regions in the troughs by an offset of substantially between 0 and 30 mm, and preferably the offset is greater than the length of the inverted regions.

In order to create even more leading edges in a honeycomb body that are not in alignment with one another, in accordance with yet an other feature of the invention, at least two inverted regions are formed at different heights on each crest and/or each trough. While using the same amount of material, additional leading edges are thus created, making a fictitious subdivision of the honeycomb body as if the body had a much greater number of channels than there are crests and troughs of the primary corrugation.

In principle, the form of a primary corrugation and that of the inverted region is not critical, as long as the primary corrugation does not have overly flat crests and troughs that could form large contacting surfaces with adjacent layers.

In accordance with yet a further feature of the invention, the primary corrugation is a zig-zag corrugation with slightly rounded crests and troughs, which produces very simple geometric conditions in terms of the inverted region and the resultant channel shapes.

In accordance with yet an added feature of the invention, the primary corrugation is equivalent to the developed view of an involute gear, as is also known from the above-discussed prior art, which is advantageous from the standpoint of manufacturing techniques and has high elasticity.

In accordance with yet an additional feature of the invention, the inverted regions themselves are approximately V-shaped or U-shaped, optionally with rounded edges or transitions to the primary corrugation.

In accordance with again another feature of the invention, the inverted regions are approximately equivalent to the shape of the teeth of an involute gear.

In a particular feature of the invention, the inverted regions can also vary the flow course, by providing that the lateral surfaces of the inverted regions do not extend parallel to the flow. This can be attained, for instance, by means of different heights of each protuberance on both end surfaces, or by means of a slightly oblique position with respect to the center lines of the channels. This version is advantageous in combination with optional openings in possible intermediate layers. Therefore, in accordance with again a further feature of the invention, the inverted regions have ends with different heights and wall surfaces extending at an acute angle relative to the direction of the channels defined by the primary corrugation.

In accordance with again an added feature of the invention, there are provided end surfaces, the inverted regions having a quantity per unit of volume increasing from one of the end surfaces to the other as seen in the direction of the channels formed by the primary corrugation. For the sake of temperature distribution in the honeycomb body, it may also be suitable not to distribute the inverted regions uniformly but instead to have the number of the inverted regions per unit of volume increase in the flow direction. This has an effect similar to that of a honeycomb body structure made of disks, in which the number of channels increases in the flow direction per unit of cross-sectional area.

In accordance with again an additional feature of the invention, the sheets are alternating layers of smooth or slightly structured and corrugated sheets having the inverted regions and being rolled, stacked or coiled together.

Metal sheets according to the invention that are corrugated with inverted regions, are suitable for practically all known production methods that were formerly applicable to merely corrugated sheets. For instance, bodies can be assembled from stacks of sheets with oppositely coiled ends or from folded stacks of sheets that are coiled around one another. The term "slightly structured sheet layer" is intended to refer to a sheet layer that is corrugated with only a slight amplitude in comparison with the primary corrugation and/or a sheet layer structured with a slight amplitude transversely to the flow direction which, however, in contrast to the primary corrugation, does not primarily determine the size of the resultant channels in the honeycomb body.

In accordance with still another feature of the invention, the smooth or slightly structured sheet layers have openings formed therein. This is done in order to promote an additional transverse mixing in the honeycomb body. This reduces the virtually linear contact surfaces between the smooth and corrugated sheet layers even further, so that the material being used is exploited particularly advantageously for catalytically active surfaces Any other features known for improving elasticity, storability, effectiveness and ease of production in metal honeycomb bodies can substantially be adapted for the present invention.

In particular, in accordance with still a further feature of the invention, the crests and the troughs have narrow contact surfaces contacting the smooth sheets.

In accordance with a concomitant feature of the invention, the contact surfaces have at least some regions being brazed or soldered to one another.

It is also possible to attach the sheet layers to a jacket tube surrounding the honeycomb body by using joining techniques.

Other features which are considered as characteristic for the invention are set forth in the appended claims.

Although the invention is illustrated and described herein as embodied in a honeycomb body with internal leading edges, in particular a catalyst body for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
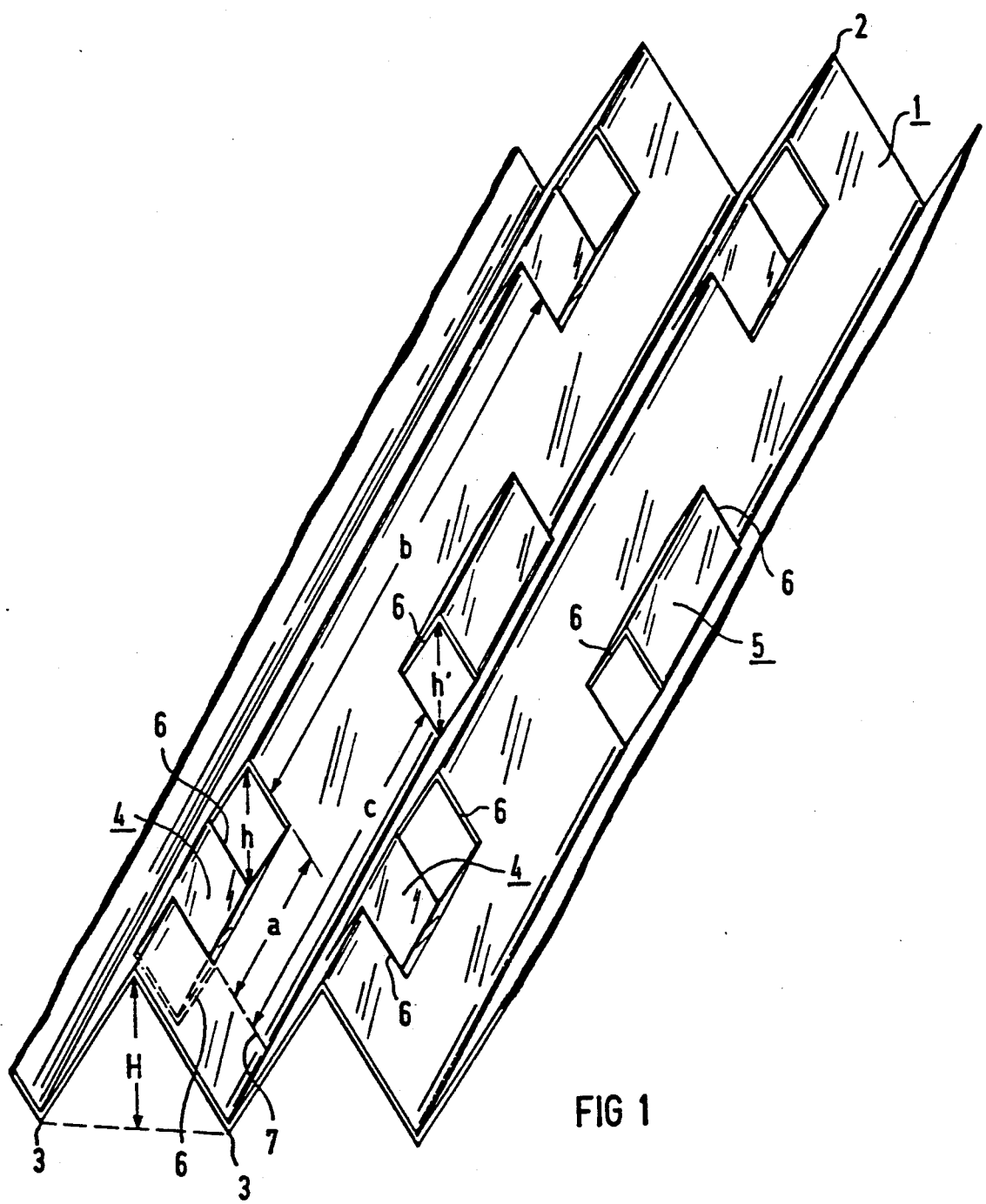
FIG. 1 is a fragmentary, diagrammatic, perspective view of a small piece of a corrugated metal sheet provided with inverted regions in accordance with the invention.

Referring now to the figures of the drawing in detail and first, particularly, to FIG. 1 thereof, there is seen a small piece of a structured metal sheet 1, which is provided with inverted regions 4 on crests 2 and inverted regions 5 on troughs 3. Honeycomb bodies according to the invention can be produced from metal sheets being structured in this way, preferably in combination with smooth sheets as intermediate layers, by stacking, rolling or coiling stacks of metal sheets in a manner that is known per se. The inverted regions 4, 5 produce additional leading edges 6 in the interior of such a honeycomb body, thereby considerably improving its efficiency without increasing the consumption of material. The inverted regions 4 and 5 have respective heights h and h'. In contrast to a corrugation height H, the dimensional accuracy of the heights of the inverted regions 4, 5 is not critical, so that in principle the various inverted regions 4, 5 can also have different heights. A typical corrugation height H for the primary corrugation is approximately 2 to 5 mm. The heights h, h' of the inverted regions should preferably be at least slightly less than the corrugation height H, so that the inverted regions do not protrude past the crests 2 and troughs 3, which would prevent stacking or rolling at a defined spacing. It should also not be possible for bridges to form between the inverted regions and adjacent layers in a coating operation. The length a of an inverted region may be between 4 and 20 mm and preferably approximately 8 to 16 mm. A plurality of inverted regions 4, 5 should follow one another at equal spacings on a respective crest 2 or trough 3, that is at distances b of from 4 to 20 mm and preferably 8 to 16 mm. For the sake of stability, it is preferable not to have inverted regions 4 of crests 2 located immediately adjacent to inverted regions 5 of troughs 3, although this is possible in principle. An offset c in the flow direction of up to 30 mm is structurally suitable Preferably, the offset c should in any case be several millimeters greater than the length a of the inverted regions 4, 5.

Figure 2:
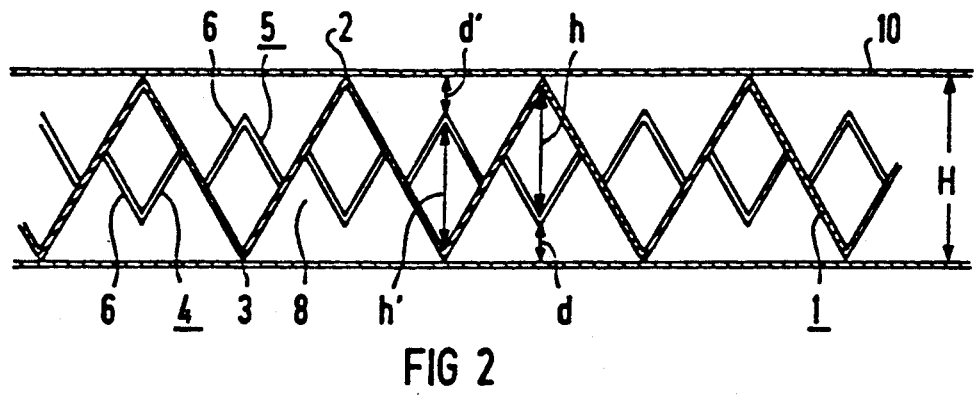
FIG. 2 is a fragmentary end view of a sheet layer of a honeycomb body provided with inverted regions in accordance with the invention.

FIG. 2 is an end view of part of a layer of a honeycomb body according to the invention, which is shown diagrammatically. A corrugated metal sheet 1, that is located between two adjoining smooth or slightly structured sheets 10, has a primary corrugation with the height H, having the crests 2 and troughs 3. The inverted regions 4, 5 produce the additional leading edges 6 in the interior of the honeycomb body. In FIG. 2, the heights h, h' of the inverted regions 4, 5 are smaller than the corrugation height H, so that a distance d or d' remains from the respective adjacent smooth or slightly structured sheets 10 to the inverted regions. The distance d, d' should be great enough to prevent undesirable bridges of material that later crumble off from being produced during subsequent coating of the honeycomb body with a ceramic composition. Nevertheless, the leading edges 6 form a structure with an effect as if the honeycomb body had almost three times as many flow channels 8 as the crests 2 and troughs 3 of the corrugated sheet. The effectiveness in catalytic conversion is correspondingly high, yet without having to use an equivalent amount of material.

Figure 3:
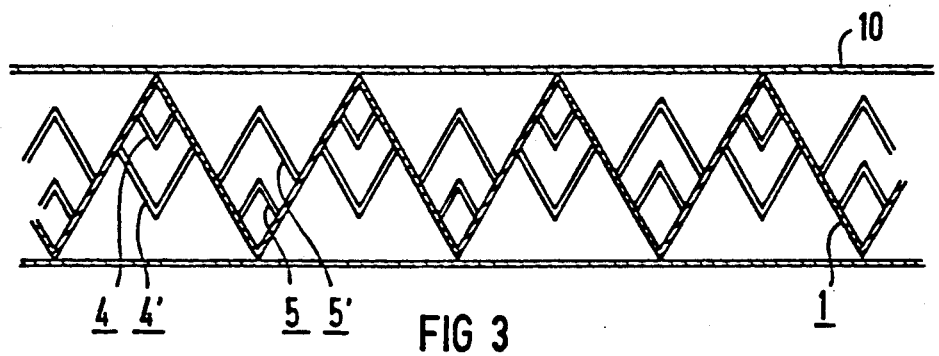
FIG. 3 is a view similar to FIG. 2 of one layer of a honeycomb body according to the invention having two inverted regions of different heights.

FIG. 3 is a view comparable to FIG. 2 that shows the effect of inverted regions 4, 4' and 5, 5' of different heights being disposed in succession. Leading edges are produced that are not in alignment with one another, which lend the honeycomb body greater effectiveness in terms of its efficiency than would correspond to the number of flow channels defined by the corrugated strip 1.

Figure 4:
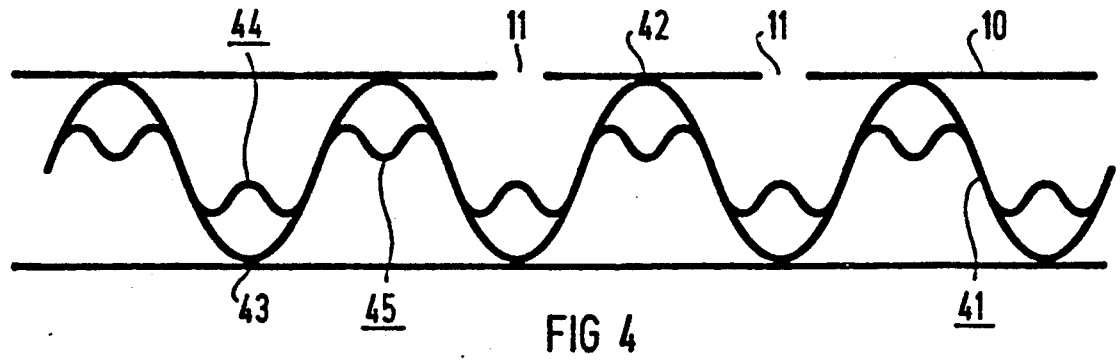
FIG. 4 is a fragmentary, cross-sectional view of a portion of a layer of a honeycomb body according to the invention having a different form of primary corrugation and of the inverted regions.

FIG. 4 is a cross section through the region of one layer of a honeycomb body according to the invention, which shows other possible shapes for the corrugation and inverted regions. A corrugated sheet 41, which is located between two smooth or slightly structured layers 10 of sheets, has approximately the shape of a developed view of an involute gear. Inverted regions 44, 45 also have the shape of the teeth of an involute gear, with rounded transitions to the primary corrugation. Crests 42 and troughs 43 may optionally be soldered or brazed to the adjoining smooth sheet layers 10. Additionally, the smooth sheet layers 10 can have openings 11 formed therein, which promote a transverse mixing of the fluid flowing in the honeycomb body between the various layers and channels.

In order to produce a sheet that is corrugated and provided with inverted regions according to the invention as shown in FIG. 1, a smooth sheet-metal strip can first be passed through a pair of corrugating rollers having the primary corrugation, which is followed by a corrugating step with corrugating rollers having a smaller corrugation 7, as suggested in FIG. 1 by broken lines. Each of these rollers only works a portion of the width of the sheet-metal strip 1. Other manufacturing methods, such as the purposeful folding of a metal sheet which is slit at the later leading edges 6, are also possible. The remaining operating steps in producing a honeycomb body according to the invention are no different from those of simple corrugated sheets in the prior art.

Due to their reduced weight, the low consumption of material and high efficiency, honeycomb bodies according to the invention are particularly suitable as catalyst carrier bodies in motor vehicles having internal combustion engines.

We claim:

1. Honeycomb body having an interior, comprising at least partly structured metal sheets forming walls of a plurality of channels through which a fluid can flow in a given direction, some of said sheets having a primary corrugation with crests, troughs and a given corrugation height, said crests having a plurality of inverted regions with a height less than said given corrugation height and said inverted regions having additional walls for dividing the fluid flow in the direction of the fluid flow in the interior of the honeycomb body.

2. Honeycomb body according to claim 1, wherein said height of said inverted regions is between ⅛ and ⅝ of said given corrugation height.

3. Honeycomb body according to claim 1, wherein said inverted regions have a length being substantially between 4 and 20 mm as seen in a flow direction.

4. Honeycomb body according to claim 1, wherein said inverted regions have a length being substantially between 8 to 16 mm as seen in a flow direction.

5. Honeycomb body according to claim 1, wherein at least two of said inverted regions are formed in succession in each of said crests as seen in a flow direction.

6. Honeycomb body according to claim 5, wherein said at least two successive inverted regions in said crests are mutually spaced apart by a distance of substantially between 4 to 20 mm.

7. Honeycomb body according to claim 5, wherein said at least two successive inverted regions in said crests are mutually spaced apart by a distance or substantially between 8 and 16 mm.

8. Honeycomb body according to claim 1, wherein each of said crests have at least two inverted regions with different heights formed therein.

9. Honeycomb body according to claim 1, wherein said primary corrugation has an approximately zig-zag shape and said crests and said troughs are slightly rounded.

10. Honeycomb body according to claim 1, wherein said primary corrugation has approximately the shape of a developed view of an involute gear.

11. Honeycomb body according to claim 1, wherein said inverted regions are approximately V-shaped or U-shaped with rounded edges or transitions leading to said primary corrugation.

12. Honeycomb body according to claim 1, wherein said inverted regions are approximately in the shape of teeth of an involute gear.

13. Honeycomb body according to claim 1, wherein said inverted regions have ends with different heights and wall surfaces extending at an acute angle relative to the direction of said channels defined by said primary corrugation.

14. Honeycomb body according to claim 1, including end surfaces, said inverted regions having a quantity per unit of volume increasing from one of said end surfaces to the other as seen in the direction of said channels formed by said primary corrugation.

15. Honeycomb body according to claim 1, wherein said sheets are alternating layers of smooth and corrugated sheets having said inverted regions and being rolled, stacked or coiled together.

16. Honeycomb body according to claim 1, wherein said sheets are alternating layers of slightly structured and corrugated sheets having said inverted regions and being rolled, stacked or coiled together.

17. Honeycomb body according to claim 15, wherein said smooth sheets have openings formed therein.

18. Honeycomb body according to claim 16, wherein said slightly structured sheets have openings formed therein.

19. Honeycomb body according to claim 15, wherein said crests have narrow contact surfaces contacting said smooth sheets.

20. Honeycomb body according to claim 19, wherein said contact surfaces have at least some regions being brazed to one another.

21. Honeycomb body according to claim 1, wherein said metal sheets form a catalyst carrier body.

22. Honeycomb body having an interior, comprising at least partly structured metal sheet forming walls of a plurality of channels through which a fluid can flow in a given direction, some of said sheets having a primary corrugation with crests, troughs and a given corrugation height, and said troughs having a plurality of inverted regions with a height less than said given corrugation height and said inverted regions having additional walls for dividing the fluid flow in the direction of the fluid flow in the interior of the honeycomb body.

23. Honeycomb body according to claim 22, wherein said height of said inverted regions is between ⅛ and ⅝ of said given corrugation height.

24. Honeycomb body according to claim 22, wherein said inverted regions have a length being substantially between 4 and 20 mm as seen in a flow direction.

25. Honeycomb body according to claim 22, wherein seaid inverted regions have a length being substantially between 8 and 16 mm as seen in a flow direction.

26. Honeycomb body according to claim 22, wherein at least two of said inverted regions are formed in succession in each of said troughs as seen in a flow direction.

27. Honeycomb body according to claim 26, wherein said at least two successive inverted regions in said troughs are mutually spaced apart by a distance of substantially between 4 and 20 mm.

28. Honeycomb body according to claim 26, wherein said at least two successive inverted regions in said troughs are mutually spaced apart by a distance of substantially between 8 and 16 mm.

29. Honeycomb body according to claim 22, wherein each of said troughs have at least two inverted regions with different heights formed therein.

30. Honeycomb body according to claim 22, wherein said primary corrugation has an approximately zig-zag shape and said crests and said troughs are slightly rounded.

31. Honeycomb body according to claim 22, wherein said primary corrugation has approximately the shape of a developed view of an involute gear.

32. Honeycomb body according to claim 22, wherein said inverted regions are approximately V-shaped or U-shaped with rounded edges or transitions leading to said primary corrugation.

33. Honeycomb body according to claim 22, wherein said inverted regions are approximately in the shape of teeth of an involute gear.

34. Honeycomb body according to claim 22, wherein said inverted regions have ends with different heights and wall surfaces extending at an acute angle relative to the direction of said channels defined by said primary corrugation.

35. Honeycomb body according to claim 22, including end surfaces, said inverted regions having a quantity per unit of volume increasing from one of said end surfaces to the other as seen in the direction of said channels formed by said primary corrugation.

36. Honeycomb body according to claim 22, wherein said sheets are alternating layers of smooth and corrugated sheets having said inverted regions and being rolled, stacked or coiled together.

37. Honeycomb body according to claim 22, wherein said sheets are alternating layers of slightly structured and corrugated sheets having said inverted regions and being rolled, stacked or coiled together.

38. Honeycomb body according to claim 36, wherein said smooth sheets have openings formed therein.

39. Honeycomb body according to claim 37, wherein said slightly structured sheets have openings formed therein.

40. Honeycomb body according to claim 36, wherein said troughs have narrow contact surfaces contacting said smooth sheets.

41. Honeycomb body according to claim 40, wherein said contact surfaces have at least some regions being brazed to one another.

42. Honeycomb body according to claim 22, wherein said metal sheets form a catalyst carrier body.

43. Honeycomb body having an interior, comprising at least partly structured metal sheets forming walls of a plurality of channels through which a fluid can flow in a given direction, some of said sheets having a primary corrugation with crests, troughs and a given corrugation height, and said crests and said troughs having a plurality of inverted regions with a height less than said given corrugation height and said inverted regions having additional walls for dividing the fluid flow in the direction of the fluid flow in the interior of the honeycomb body.

44. Honeycomb body according to claim 43, wherein said height of said inverted regions is between $\frac{1}{4}$ and $\frac{3}{4}$ of said given corrugation height.

45. Honeycomb body according to claim 43, wherein said inverted regions have a length being substantially between 4 and 20 mm as seen in a flow direction.

46. Honeycomb body according to claim 43, wherein said inverted regions have a length being substantially between 8 and 16 mm as seen in a flow direction.

47. Honeycomb body according to claim 43, wherein at least two of said inverted region are formed in succession in each of said crests and troughs as seen in a flow direction.

48. Honeycomb body according to claim 47, wherein said at least two successive inverted regions in said crests and said troughs are mutually spaced apart by a distance of substantially between 4 and 20 mm.

49. Honeycomb body according to claim 47, wherein said at least two successive inverted regions in said crests and said troughs are mutually spaced apart by a distance of substantially between 8 and 16 mm.

50. Honeycomb body according to claim 43, wherein said inverted regions in said crests are shifted in a flow direction with respect to said inverted regions in said troughs by an offset of substantially between 0 and 30 mm.

51. Honeycomb body according to claim 50, wherein said offset is greater than the length of said inverted regions.

52. Honeycomb body according to claim 43, wherein each of said crests and each of said troughs have at least two inverted regions with different heights formed therein.

53. Honeycomb body according to claim 43, wherein said primary corrugation has an approximately zig-zag shape and said crests and said troughs are slightly rounded.

54. Honeycomb body according to claim 43, wherein said primary corrugation has approximately the shape of a developed view of an involute gear.

55. Honeycomb body according to claim 43, wherein said inverted regions are approximately V-shaped or U-shaped with rounded edges or transitions leading to said primary corrugation.

56. Honeycomb body according to claim 43, wherein said inverted regions are approximately in the shape of teeth of an involute gear.

57. Honeycomb body according to claim 43, wherein said inverted regions have ends with different heights and wall surfaces extending at an acute angle relative to the direction of said channels defined by said primary corrugation.

58. Honeycomb body according to claim 43, including end surfaces, said inverted regions having a quantity per unit of volume increasing from one of said end surfaces to the other as seen in the direction of said channels formed by said primary corrugation.

59. Honeycomb body according to claim 43, wherein said sheets are alternating layers of smooth and corrugated sheets having said inverted regions and being rolled, stacked or coiled together.

60. Honeycomb body according to claim 43, wherein said sheets are alternating layers of slightly structured and corrugated sheets having said inverted regions and being rolled, stacked or coiled together.

61. Honeycomb body according to claim 59, wherein said smooth sheets have openings formed therein.

62. Honeycomb body according to claim 60, wherein said slightly structured sheets have openings formed therein.

63. Honeycomb body according to claim 59, wherein said crests and said troughs have narrow contact surfaces contacting said smooth sheets.

64. Honeycomb body according to claim 63, wherein said contact surfaces have at least some regions being brazed to one another.

65. Honeycomb body according to claim 43, wherein said metal sheets form a catalyst carrier body.

66. Honeycomb body having an interior, comprising at least partly structured metal sheets forming walls of a plurality of channels through which a fluid can flow in a fluid flow direction, some of said sheets having a primary corrugation with crests, troughs and a primary corrugation height, and said crests having a plurality of inverted regions in the form of secondary corrugations with a height less than said primary corrugation height and said inverted regions having troughs extending parallel to said crests of said primary corrugation and forming additional walls for dividing the fluid flow in the fluid flow direction.

* * * * *